Patented Dec. 4, 1928.

1,694,122

UNITED STATES PATENT OFFICE.

ALPHONS O. JAEGER, OF PITTSBURGH, PENNSYLVANIA, ASSIGNOR TO THE SELDEN COMPANY, OF PITTSBURGH, PENNSYLVANIA, A CORPORATION OF DELAWARE.

CATALYTIC OXIDATION OF ORGANIC COMPOUNDS.

No Drawing.   Application filed November 24, 1926.   Serial No. 150,623.

The present invention relates to processes for the catalytic oxidation of organic compounds and particularly for the catalytic oxidation of organic compounds in the gaseous phase.

Catalytic oxidations of organic compounds are usually directed to the production of an intermediate oxidation product and it is, therefore, of prime importance to carry on the reaction producing the intermediate product as rapidly and as completely as possible and to prevent, as far as possible, further oxidation. This control of reaction may be effected in numerous ways, such as, for example, by cooling or heating means, variations in the composition of the reaction gases, and particularly the nature of the catalyst or catalysts used.

In the past, the catalysts used for organic oxidation have been mainly oxides and salts of various elements, such as vanadium molybdenum, tantalum, tungsten, chromium, uranium, manganese, bismuth, iron, cobalt, nickel, copper, silver, etc. These catalysts, however, present many disadvantages and particularly they tend to cause the oxidation to proceed too far and it is, therefore, necessary either to be content with relatively low yields or to keep the loading of the catalyst at fairly low figures. Both of these expedients result in serious enconomical disadvantages.

Even when the average temperature of the catalytic mass is satisfactorily controlled, there is a serious tendency of the catalysts used in the past to form zones of local overheating due to the excessive activity of the catalysts and to the fact that it is difficult to dilute them with perfect homogeneity.

The present invention overcomes partly or wholly most of the disadvantages set out above and consists broadly in the oxidation of organic compounds, especially in the vapor phase, in the presence of catalysts or contact masses in which part or all of the catalytically active elements are present in the form of zeolites, that is to say, base exchange polysilicates which are formed by methods analogous to those of the natural or artifical water-softening zeolites which are usually either aluminum double silicates or aluminosilicates. Among the natural zeolites are nepheline, leucite, felspars and the like and numerous artificial aluminum zeolites have been prepared for water softening means. In general, the zeolites are prepared by the reaction of two classes of components, silicates and either metallates or metal salts. The reaction may be in solution or in the molten state. Throughout the present application, the word "zeolite" is strictly limited to base exchanging products which are prepared or which result as the reaction products of two reacting components, one of which at least is a silicate.

The zeolite catalysts of the present invention are characterized by a highly porous, honeycomb like structure and show high resistance to melting, recrystallization and poisoning. The zeolites may be used either diluted or undiluted, but for practical reactions and particularly strongly exothermic oxidations, I find that diluted zeolites, in which the diluent bodies are mixed with the zeolite components to form a physically homogenous whole, are preferable and give in practice the highest yields and best results. The invention, however, is in no sense limited to the use of these diluted zeolite catalysts, which constitute the preferred embodiment thereof, and undiluted zeolites may be used or they may be diluted by mechanical mixture with diluent bodies or by any other suitable means, such as, for example, by impregnation into porous diluents and the like.

According to the present invention, all types of vapor phase organic oxidations may be effected by means of suitable catalysts as will be described more fully below. Among the classes of organic oxidations are the following: Alifatic compounds such as alcohols to aldehydes, for example, methyl alcohol to formaldehyde, ethyl alcohol to acetaldehyde and acetic acid, ethylene chlorhydrine to chloracetic acid and the like; alifatic hydrocarbons to alcohols, aldehydes and the like, such as for example, methane to formaldehyde; aromatic hydrocarbons to oxygen containing compounds with rupture of one or more of the rings, such as, for example, benzol, toluol, phenol, tar acids, benzoquinone, or phthalic anhydride to maleic and fumaric acids, naphthalene to phthalic anhydride and maleic acid, phenanthrene to diphenic acid, acenaphthene to naphthaldehydic acid, naphthalic anhydride and hemimellitic acid, etc.; aromatic hydrocarbons to quinones without rupture of the ring, such as benzol to benzoquinone, anthracene to anthroquinone, phenanthrene to phenanthraquinone, acenaphthene to acenaphthaquinone and bisacenaphthylidenedione, fluorene to fluorenone, aromatic hydroxy compounds to aldehydes and acids, such as naphthalene to alphanaphthaquinone; eugenol and isoeugenol to vanillin and vanillic acid; oxidations of side chains of aromatic compounds, such as, for example, toluol to benzaldehyde and benzoic acid, cresol to salicylaldehyde and salicylic acid, substituted toluols such as chlorbrom and nitrotoluols to the corresponding aldehydes and acids, xylenes, pseudocumenes, mesitylenes, paracymenes and their derivatives to the corresponding aldehydes and acids; dehydrogenation reactions such as acenaphthene to acenaphthylene, etc.

In general, any reaction in which an organic compound is oxidized or dehydrogenated can be carried out with the zeolite catalysts of the present invention. Reactions in which air is the oxidizing agent are included, and also reactions in which other oxygen containing gases are used, with or without dilution by inert or semi-inert gases. The reactions in general should take place at temperatures below red heat, that is to say, 580° C., but will vary within wide limits, depending on the nature of the reaction and upon the apparatus used.

The catalytic elements may be present in zeolites in four different forms, namely, in the zeolite nucleus, that is to say, in non-exchangeable form, as one of the exchangeable cations of the zeolite, as an anion which may form with the zeolite a salt-like body, and finally, in the case of diluted zeolites in the diluent, which may either be itself a catalyst or may be impregnated with catalytic components. Obviously, of course, catalytic elements may be present in more than one of these forms in a single catalyst and a large number of such combinations are possible.

In addition to the elements which are actual catalysts, certain other elements, while not themselves specific catalysts for the particular reaction, appear to exert a marked effect on the catalytic components themselves and may be termed activators. The $SiO_2$ group notably appears to possess marked activating powers, and it is one of the advantages of the present invention that the same zeolite structure or framework which permits the fine or molecular distribution of catalytic atoms or groups in a highly porous, physically homogeneous product, also supplies the activating $SiO_2$ group.

Many of the oxidation reactions for which the zeolite catalysts of the present invention are excellently suited require a considerable diminution of catalytic activity in the catalyst in order to stabilize it and cause the reaction to preferentially proceed only to the desired intermediate product. Non-alkaline salts or compounds of alkali-forming metals have proved to be important stabilizers, and may be mixed with zeolite catalysts of the present invention or in many cases may be formed in intimate physical or physical-chemical combination with the catalysts themselves by suitable treatment with certain acid gases before use. I do not claim in this application the use of such stabilizers generally, this forming the subject-matter of my co-pending application Serial No. 196,393, filed June 3, 1927. In the present application, however, all such stabilizing means mixed with or formed on zeolite catalysts are included as specific features of the present invention.

It is an advantage of the present invention that an enormous number of different catalysts can be prepared, all sharing the extremely advantageous physical structure of the zeolites and being provided with suitable silicious activating components. The chemical combination of the zeolite molecule is not accurately known because it is impossible to obtain the molecular weight of the product without disintegrating it. Without limiting the present application to any theories of zeolite constitution, I am of the opinion that the zeolite molecules existing in actual products are of extremely high molecular weight because I have found that catalytic components can be introduced and chemically combined in the zeolite nucleus in substantially any desired proportions. This indicates that the molecule is not of low weight, as otherwise, the law of molecular proportions would at once become apparent. It is, of course, possible that the zeolites are not of high molecular weight, but consist of a solid solution of different simple zeolites. The underlying chemical reasons are, however, not important, the main thing being that it is possible to introduce catalytic components in almost any desired proportions into the zeolite molecule in non-exchangeable form so that it is possible to prepare catalysts having just the right proportions of one or more catalytic components for any particular reaction, a feature which is of enormous value to the catalytic chemist.

The nucleus or non-exchangeable portion of the zeolite molecule is ordinarily considered to consist of metal oxides, usually amphoteric metal oxides, combined with $SiO_2$ to form an anion which appears to behave as a single group and cannot be split by ordinary chemical means without destroying the zeolite. A large number of catalytically active metal oxides may be introduced into this portion of the zeolite nucleus either in the form of their metallates or in the form of neutral or acid salts or complex compounds. In some cases it may be necessary to introduce the desired metal in a stage of oxidation different from that which it is to finally possess in the finished zeolite, and effect suitable oxidation or reduction during zeolite formation. The following elements in suitable stages of oxidation in which they possess the desired amphoteric properties may be included in the metal oxide portion of the zeolite: copper, silver, gold, bismuth, beryllium, zinc, cadmium, boron, aluminum, rare earths, titanium, zirconium, tin, lead, thorium, niobium, antimony, tantalum, chromium, molybdenum, tellurium, tungsten, uranium, vanadium, manganese, iron, nickel, cobalt, osmium, arsenic. They may be introduced singly or in mixtures in any desired proportion and may be in the form of simple or complex ions. Some of these metals are catalysts and others are activators, depending on the particular reaction, and the choice of catalyst and activators, together with the amounts and proportions, must be determined in each case in order to produce the best results in any given reaction. It is an advantage of the present invention that the combination and proportioning of the elements is almost unlimited, so that the catalytic chemist is not restricted in his choice.

It is not necessary that all of the catalytic components of the zeolite catalyst should be of the same nature, although in many reactions this is desirable. There are, however, numerous reactions which are not pure oxidations and which may involve not only the oxidation, but splitting off of water, or in some cases condensation or splitting off of $CO_2$. In such cases, it is frequently desirable to utilize catalysts which contain not only oxidation catalytic components, but also dehydration, condensation, $CO_2$ splitting or other types of catalytic components. It is an advantage of the present invention that it is possible in most cases to introduce a plurality of these types of catalytic components into a single zeolite catalyst, instead of requiring mechanical mixture of the different types of catalysts. While this is an advantage of the present invention, it should be clearly understood that in some cases it may be desirable to restrict each zeolite catalytic component and to effect a mechanical or other mixture of the different types. Obviously, of course, instead of introducing a plurality of types of catalytic components into the zeolite nucleus, one type of component may be introduced into the nucleus and another type into another portion of the molecule or into diluent bodies incorporated therein to form a physically homogeneous whole.

I have found that for most organic oxidations, and particularly oxidation of aromatic compounds, the zeolites which contain vanadium as one of the non-exchangeable metal oxide components and their nucleus, are the most effective and may be considered in general as the preferred type of zeolite catalysts. In certain reactions, however, particularly where relatively low stages of intermediate oxidation are desired, it is sometimes advantageous to completely eliminate vanadium in order to prevent too vigorous an oxidizing effect, and such zeolite catalysts, which may contain little or no vanadium in the nucleus, are included in the present invention.

The vanadium which is present in the nucleus, may be in the form of trivalent, tetravalent or pentavalent vanadium, and for some catalysts, it is very desirable to introduce into the nucleus part of the vanadium in one stage of oxidation and part in another. A similar possibility exists with respect to other metal elements which are capable of introduction in different stages of oxidation and particularly with elements of the fifth and sixth groups, such as: niobium, antimony, tantalum, chromium, molybdenum, tungsten, bismuth and uranium.

The $SiO_2$ portion of the zeolite nucleus does not necessarily have to consist solely of $SiO_2$, although for many catalysts the activating or stabilizing effect of the $SiO_2$ radical makes this desirable. In other cases, it may be desirable that part of the $SiO_2$ should be substituted by a suitable acidic oxide which is capable of zeolite formation and in this way components of catalytic, activating or stabilizing effect can be introduced, such as, for example, one or more of the acidic oxides of: phosphorus, sulfur, tin, titanium, tungsten, chromium, niobium, tantalum uranium, sten, chromium, niobium, tantalum, uranium, etc. The present invention, however, does not include processes of oxidation in which a base exchange catalyst is used which does not contain $SiO_2$. Processes using such catalysts do not come under the definition of the word "zeolite" as used in the present invention and form the subject-matter of the co-pending application Serial No. 171,727 filed Feb. 28, 1927.

Additional catalytic, activating or stabilizing components can be introduced by base exchange. Examples of such components are the simple or complex ions of: lithium, sodium, potassium, ammonium, copper, rubidium, cæsium, silver gold, beryllium, magnesium, calcium, zinc, strontium, cadmium, barium, mercury, aluminum, thallium, titanium, zirconium, tin, antimony, thorium, vanadium, bismuth, chromium, uranium, manganese, cobalt, iron, palladium, platinum.

After the zeolite is formed, it may then be caused to react with compounds having suitable anions which form with the zeolite bodies which behave in many ways as if they were salts. It is not known whether actual salts are formed, since, of course, the products are for the most part not soluble in water and the invention is, therefore, not limited to any particular chemical theory of combination. Among the anions which can be caused to react with zeolites under suitable conditions to form salt-like bodies are the acidic oxides of the following elements: vanadium, tungsten, uranium, chromium, molybdenum, manganese, tantalum, niobium, antimony, selenium, tellurium, arsenic, phosphorus, bismuth, sulfur, chlorine, platinum, boron. These elements may be introduced in the form of simple or complex anions, such as for example, ferro and ferricyanogen, sulfocyanogen, metal cyanogen, and ammonia complexes also may be cause to react with zeolites. A single anion or a plurality of anions can be caused to react either simultaneously or successively.

It will thus be apparent that there are four groups within the zeolite body, the nonexchangeable nucleus with its metal oxide and acidic oxide components, the exchangeable cations and the anions which form with the zeolites salt-like bodies. The effect of a particular catalytic element is not necessarily the same when it is present in the nucleus as when it is present, for example, as an exchangeable cation and it is thus possible to form innumerable combinations which permit the catalytic chemist to produce catalysts having characteristics exactly adjusted for the particular oxidation which he desires to carry out.

In all cases, the catalytic components are distributed throughout the zeolite molecule in a state of molecular subdivision and apparently are protected to a large extent by the surrounding zeolite skeleton or framework so that they are far less subject to poisoning and to other deleterious influences. The products are also for the most part highly resistant to the temperatures which obtain in the catalytic oxidations in question and the highly porous, honeycomb-like structure of the zeolite operates to greatly enhance the catalytic activity of the catalytic components.

For many organic oxidations, it is not desirable to use undiluted zeolites as catalysts, because, unless the proportion of catalytic component is very small, the catalysts are too strong and tend to evolve excessive amounts of heat since most of the reactions are highly exothermic. While in certain cases, therefore, it is possible to use undiluted zeolite catalysts in organic oxidations and the present invention includes such use, I prefer, for the most part, to use diluted zeolites, which, in general, are of more satisfactory catalytic activity and which also usually are cheaper to produce, as, in general, the diluent bodies used are less costly than the zeolite components themselves.

Almost any inert or activating body can be used as a diluent. Preferably, however, I use porous diluents and particularly diluents which are rich in silica in order to enjoy the valuable stabilizing and activating properties of the $SiO_2$ group, which has been mentioned in connection with the zeolite structure itself. The use of diluents rich in silica is particularly important when aromatic hydrocarbons are to be oxidized. A few of the many possible diluents are the following: kieselguhrs of all kinds, particularly natural or treated "celite" earths, silicious powders of all kinds, powdered zeolites, either natural or artificial, powders of rock, stones, tuffs, trass, lava and similar volcanic products which are frequently highly porous, green sand, glauconite, pulverized slag wool, cements, sand, silica gel, pulverized earthenware, fuller's earth, talc, glass powder, pumice meal, asbestos, graphite, quartz meal and powders of various minerals rich in quartz, metal powders, metal oxides and salts, particularly tungstates, vanadates, chromates, uranates, manganates, cerates, molybdates, etc. Some of these diluents are inert, others contain silica and may be considered as activators, and still others are themselves catalytically active. It should be noted that when an inert body is sufficiently finely divided, as for example, when the average particle size is less than 60 microns, the diluent possesses surface energy which increases the absorption and diffusion speed and porosity of the final product and, therefore, may be considered as a kind of physical catalyst or activator.

The diluents may be incorporated in many ways, for example, they can be mixed with one or more of the zeolites before formation. The zeolite gel immediately after formation may be mixed with diluents or a combination of these processes can be carried out. Zeolite components or the finished gel may be impregnated into diluents, usually porous diluents and the like. When the diluent is mixed with the components or gel before hardening and in some cases, where the zeolite components are impregnated into the diluent in considerable amount, the resulting product is a physically homogeneous whole, in which the diluent particles are uniformly distributed throughout the zeolite framework, and for many purposes this type of product is the most satisfactory, although the invention is in no sense limited thereto.

It should be understood that diluent bodies may be impregnated with various catalytic components before incorporation in the zeolite and many highly active catalysts can be produced in this way. The impregnation may be by precipitation, reduction, oxidation or by the introduction of colloidal suspensions, or solutions of the catalytic component. In some cases catalytic components may also be caused to react with the diluent or to form therewith chemical compounds, although this is not as common, since most of the diluents are relatively inert chemically.

Many possible types of diluted zeolites and processes are fully described in a large number of examples in the application of Jaeger and Bertsch, Serial No. 95,771, filed March 18, 1926, and any of the processes and products therein described may be used to produce catalysts of the present invention.

Instead of incorporating catalytic components chemically combined with the zeolite, a non-catalytic zeolite may be used as a carrier or diluent for catalytic components impregnated into the fine pores of a natural or artificial zeolite. In such a case, the zeolite acts as an activator by reason of its physical structure and its high content of silica. Instead of impregnating catalytic components into a finished zeolite, it is also possible to incorporate insoluble catalytic bodies with the components of the zeolite during formation so that the catalytic particles are uniformly and homogeneously distributed throughout the zeolite structure, but are, of course, in most cases, not in a state of molecular division as in the case of catalytic components chemically combined with the zeolite. Another important class of catalysts is produced by impregnating inert or activating diluent bodies with catalytic components and then incorporating these impregnated diluents into a zeolite which is not itself catalytically active. In all cases, the advantages of the zeolite structure are obtained and the particular catalyst to be used in any given reaction will be determined by the conditions of that reaction.

In some cases, the homogeneous diluted zeolite may be advantageously in the form of a film or coating on massive carrier granules or fragments and such contact masses are included in the present invention. The massive carriers may be inert, activating or themselves catalytic, as, for example, when certain catalytic metal alloys are used. Certain contact masses using metal fragments as massive carriers are also of importance in some exothermic reactions as they tend to improve the heat conductivity of the catalyst layer and prevent the formation of local hot spots which are so serious in many organic oxidations.

The remarkable effectiveness of the zeolite catalysts of the present invention for organic oxidations is probably due to a number of features such as the advantageous porous, physical structure of the catalysts, their high resistance to the temperatures which obtain in the reactions, the activating power of the silica present, etc. Without limiting the invention to any theories, however, I am of the opinion that one of the most important reasons for the effectiveness of the catalysts lies in the fact that the zeolite framework separates the individual catalyst particles or catalyst molecules from each other so that at no point in the catalyst is there a large amount of active catalytic material present. There is, therefore, not such a tendency to the formation of local hot spots due to too violent reaction. I have found that in most organic oxidations the intermediate products are more or less unstable, particularly in the presence of the catalysts which cause their formation and at elevated temperatures. I am, therefore, of the opinion that the far reaching isolation, and, to a certain extent, insulation of one catalyst particle or molecule from the other prevents the decomposition of the intermediate products formed because they are almost immediately brought out of contact with the catalyst and the heat evolved is uniformly distributed throughout the zeolite framework.

In many organic oxidations the presence of an alkali is undesirable and the alkalinity of most zeolites is preferably neutralized, and in many cases it is desirable to have the product distinctly acid. This neutralizing of alkali can be effected in several ways. In the first place, the zeolite reaction can be caused to take place in solutions which are not strongly alkaline. The resulting products have a comparatively low base exchange power and perhaps there is formed a mixture of zeolites and nonbase exchanging polysilicates. The physical structure, however, is similar to that of the zeolites which possess strong base exchanging powers, and for many purposes the catalysts are just as effective. In some reactions, this diminished alkalinity may be sufficient to permit the reaction to be carried out satisfactorily. In other cases, where even this degree of alkalinity is undesirable, the zeolite may be treated with acids to form salt-like bodies which are acid in their nature, the product, of course, varying with the amount of acid which is caused to react with the zeolite. I have found, however, that in the case of most catalysts it is desirable to subject the product to treatment with an acid gas at temperatures of from 400–500° C., in the presence of air or other oxidizing medium. Such acid gases may be $SO_2$, $SO_3$, halogens, oxides of nitrogen, etc., and the process is described in my prior Patents Nos. 1,678,626 and 1,678,627, patented July 24, 1928.

This procedure in the case of most zeolite catalysts has the additional advantage that the acid gas reacts with the alkali present to form salts of the alkali forming metals, which, as has been pointed out above, act as stabilizers and tend to prevent the reaction from becoming uncontrolled and proceeding to total combustion with serious losses in yield. This treatment also appears in most cases to enhance the activity of the zeolite and possibly this is due to physical changes which may take place. In general, it should be clearly understood that all zeolite catalysts undergo certain secondary chemical and perhaps physical transformations during catalysis, and, therefore, the use of the word "zeolite" or "zeolite body" in the claims is not intended to limit the present invention to processes in which the zeolite identity of the catalyst remains throughout the reaction. I do not know what the nature of these secondary chemical transformations is, and, therefore, in the claims, the word "zeolite" is used to cover zeolites which have undergone secondary changes during catalysis as a result of preliminary treatment with acid gases. In all cases, however, the macroscopic, and in many cases, the microscopic, physical structure of the zeolite catalyst remains unchanged.

For the most part, zeolite catalysts of the present invention are sufficiently porous, but in some cases it may be desirable to still further increase this porosity. In such cases, soluble, volatile or combustible fillers, may be incorporated into the zeolite and later on removed, leaving corresponding hollow spaces and still further increasing the porosity of the product.

In most cases, the zeolite catalysts are of sufficient mechanical strength to withstand all the ordinary strains to which they are subjected during catalysis. In some cases, however, particularly where the zeolite is diluted with a very large amount of diluents, the mechanical strength may be insufficient for catalytic purposes. In such cases, the product may be washed with water glass, particularly dilute solutions of water glass and a certain amount of surface silicification is thereby effected. At the same time, this treatment may be used to neutralize or change the degree of alkalinity of the product.

The catalysts of the present invention are primarily of importance for vapor phase organic oxidations, but it should be understood that they are not limited in their utility to this class of organic oxidations, and on the contrary, many of them are highly active in liquid phase oxidations or in oxidations which may take place in suspensions, and the present invention includes in its broader aspect such oxidations when carried out with zeolite catalysts.

In the following specific examples, a number of representative zeolite catalysts are described, together with variuos organic oxidations, in which they are used as catalysts. The invention is, of course, not limited to the catalysts specifically enumerated, nor to the methods of formation of the catalysts therein described, although an attempt has been made to illustrate as many as possible of the different methods of zeolite formation in the examples. In general, however, any suitable processes for the formation of the zeolites may be used, such as for example, any of the processes described in the copending applications of Jaeger and Bertsch, Serial No. 91,229, filed Feb. 27, 1926, Serial No. 95,771, filed Mar. 18, 1926, and Serial No. 100,116, filed Apr. 6, 1926.

*Example 1.*

The following five mixtures are made:
(1) 7 mols. of $SiO_2$ in the form of a 30–33° Bé. potassium waterglass solution are diluted with 8 volumes of water and 2 mols. of a 10% solution of potassium phosphate are added. Finely ground asbestos fibres are then stirred in until the mixture just remains easily stirrable.
(2) 1 mol. of a 10 N aqueous solution of potassium tungstate is prepared.
(3) ½ mol. of vanadic acid is dissolved in caustic potash to form a 10 N solution.
(4) ½ mol. of molybdic oxide is dissolved in caustic potash to form a 10 N solution.
(5) ½ mol. of $V_2O_5$ is melted with oxalic acid in order to reduce it and is then dissolved up in 10% caustic potash solution to form the coffee brown vanadite.

Solutions 2, 3 and 4 are then mixed and poured into suspension 1 to which solution 5 is added with vigorous agitation. The mixture is heated up to 65–70° C. and a 10% sulfuric acid solution is added in small portions until a gel is formed. The solution should remain at all times alkaline to litmus. A diluted zeolite precipitates out containing in non-exchangeable form tetravalent and pentavalent vanadium, tungsten and molybdenum, together with a mixture of $SiO_2$ and phosphoric acid. The mass is pressed, treated with a 3% hydrochloric, sulfuric or phosphoric acid solution, dried, broken into small fragments and calcined in air, the temperature gradually rising to 400° C. A salt-like body is thus obtained.

The product so treated is an excellent catalyst for the oxidation of toluol to benzaldehyde. A mixture of toluol and oxygen containing gases in the proportion of 2 gms. of toluol to 30 l. of air is passed over the catalyst at 340–380° C. in a converter provided with excellent heat-dissipating means. Instead of air, a mixture of carbon dioxide and oxygen in the proportion of 10:2 may be used in a circulatory process, the carbon dioxide acting as a permanent inert diluent gas, oxygen being added at a suitable place in the circulation and the benzaldehyde and benzoic acid produced being separated in another part of the circuit.

*Example 2.*

The catalyst is prepared as described in Example 1, but instead of treating the product with dilute acids to form a salt-like body, a 3–5% ferrous sulfate solution is permitted to trickle over the zeolite which results in exchanging at least part of the alkali of the zeolite for iron.

Anthracene vapor and air in the proportion of 1 gr. anthracene to 20–30 l. of air is passed over the catalyst in a suitable converter at temperatures preferably between 360 and 380° C. A high yield of anthraquinone is obtained and the product is of high purity, being practically free from further oxidation products such as phthalic anhydride and maleic acid.

*Example 3.*

The following mixtures are prepared:
(1) 280 parts of pumice meal or asbestos fibres are impregnated with about 2% of cobalt in the form of the nitrate dissolved in sufficient water to permit impregnation to form a moist mass. The impregnated pumice is then stirred into a waterglass solution of about 33° Bé. containing 4–5 mols. of $SiO_2$, which solution has been previously diluted with about 5–6 volumes of water.
(2) .5 mol. of $V_2O_5$ is dissolved in sodium hydroxide to form a normal solution which is almost neutral to litmus. About .7 mol. of iron in the form of ferrous sulfate in moderate dilute aqueous solution is then added and iron vanadate mixed with iron oxide is precipitated.
(3) 1 mol. of $V_2O_5$ is treated with 2% of its weight of concentrated surfuric acid and diluted with 20 parts by weight of water. The mixture is boiled gently and gaseous $SO_2$ is passed through the acidified vanadic acid suspension until a clear blue solution of the vanadyl sulfate is formed. The blue solution is then gradually treated with 10 N caustic soda until the precipitate of vanadyl hydroxide which forms at first dissolves in the caustic soda to form a coffee brown sodium vanadite solution.

The suspensions 1 and 2 are then poured together and at once the solution 3 is permitted to flow in in a thin stream with vigorous agitation. Most of the excess alkali is neutralized with 10% sulfuric acid and the gel which forms is well pressed, washed two or three times with 300 parts of water and dried at a temperature of 100° C. The product is a zeolite body containing tetravalent vanadium diluted with impregnated pumice meal or asbestos fibres and iron vanadate.

The product is cautiously treated with 3–5% hydrochloric, sulfuric or phosphoric acid so as not to destroy the zeolitic structure of the body and dried preferably under 100° C. A salt-like body results. The catalyst is then dehydrated by blowing air over it and gradually permitting the temperature to rise to 450° C.

The catalyst thus prepared is excellent for the vapor phase oxidation of anthracene to anthraquinone and acenaphthene and its halogen derivatives to the corresponding naphthalic acid anhydrides. The vapors of the aromatic hydrocarbon should be mixed with air in the proportion of 1:18 by weight and passed over the catalyst at about 330–420° C. The proportions of anthracene or acenaphthene to air can also be varied within fairly wide limits without seriously affecting the yield.

*Example 4.*

500 parts of quartz powder or a powder of a neutral rock high in silica are suspended in 500 parts of water to form a slurry to which 91 parts of $V_2O_5$ in the form of 5% potassium metavanadate solution are added and precipitated with an equimolecular quantity of 5% copper sulfate solution, the copper vanadate being precipitated in a very fine state of division. If desired, the copper vanadate thus produced can also be replaced by cobalt vanadate prepared in a similar manner. 200–240 parts of $SiO_2$ in the form of a dilute potassium waterglass solution are stirred in. The waterglass solution may be prepared by diluting a 36° Bé. solution with three times its weight of water. 182 parts of $V_2O_5$ are then treated with 50 parts of concentrated sulfuric acid and suspended in 3500 parts of water. The suspension is heated to the boiling point and gaseous $SO_2$ is passed in until all of the vanadic acid is transformed into vanadyl sulfate. Thereupon, 10 N caustic potash is added until the vanadyl hydroxide which at first precipitates is dissolved up to form a coffee brown solution of potassium vanadite. The vanadite solution is then stirred into the suspension of solids in waterglass and a little 5% sulfuric acid is added with vigorous agitation until the excess alkali is somewhat reduced and the whole mass solidifies to a gel which is stirred vigorously for about one-half hour at 60–70° C., pressed, washed four or five times with about 100 parts of water, dried below 100° C. and broken in fragments. The fragments are then calcined at 400–500° C. at first in a stream of air and later in a stream of gases containing from 3–5% of SO$_2$. A short treatment with air follows to remove the acid gases and the product is then ready for the catalytic oxidation of aromatic compounds.

Benzol, toluol, phenol, tar acids or phthalic anhydride vapors mixed with air in the proportion of 1 gr. of the aromatic substance to from 16–25 grs. of air are passed over the catalyst at 350–420° C. An excellent yield of maleic and fumaric acids of good quality is obtained.

*Example 5.*

100 parts of an ordinary artificial zeolite containing sodium and aluminum prepared either by fusion or wet methods or similar amounts of a natural zeolite are repeatedly digested with a 5% lead nitrate solution introducing lead into the zeolite by base exchange. The adhering lead nitrate solution is then removed by washing and the product treated with a 10% potassium vanadate solution until the vanadate of the lead zeolite is formed (i. e. a salt-like body). The excess vanadate is then thoroughly washed out, the product first dried at temperatures under 100° C. in a stream of air followed by calcination at 400° C.

A mixture of acenaphthene vapors and air in the proportion of 1:14 is passed over the catalyst at 300–450° C. and excellent yields of acenaphthylene is produced.

*Example 6.*

A zeolite is prepared as described in Example 5, except that copper, nickel, cobalt, silver, manganese, chromium or aluminum is introduced instead of lead, and the zeolite treated with one or more acids of the fifth and sixth groups, such as vanadic acid, tantalic acid, bismuthic acid, chromic acid, molybdic acid, tungstic acid or uranic acid. The product is calcined as described in the foregoing example, and benzol, toluol, phenol, or tar acid vapors mixed with air in the proportion of from 1:10 to 1:35 are passed over the catalyst at 320–450° C and good yields of maleic and fumaric acid are obtained.

The same catalyst can be used for the oxidation of ortho and parachlor and brom toluols, dichlor toluols, chlor-brom toluols, nitro toluols, chlor-nitro toluols and brom-nitro toluols to the corresponding aldehydes and acids. Preferably in the case of nitro toluols a mixture of oxygen and inert gases containing only moderate percentages of oxygen is used and the catalyst should be very thoroughly cooled.

*Example 7.*

An artificial carrier is prepared by mixing 100 parts of kieselguhr and 120 parts of 34° Bé. potassium waterglass solution and forming into tablets. The tablets are first treated with 18.2 parts of V$_2$O$_5$ either in the form of a 10% potassium vanadate solution or a hot saturated ammonium vanadate solution. The impregnation is effected by spraying the solutions onto the tablets, the later being continuously turned over and heated to a temperature sufficient to effect vaporation of the water. A little potassium silicate solution is then cautiously sprayed onto the tablets in the same manner. This solution may preferably be made by diluting a 33° Bé. solution, containing about 24 parts of SiO$_2$, with 100 parts of water. If desired, the sequence may be reversed and the potassium waterglass first sprayed on followed by the vanadate solution.

By either method, a film of a vanadium zeolite is formed on the artificial carrier in a nascent state. The product is then treated with air containing carbon dioxide at a temperature below 100° C. and then with gases containing SO$_2$ at 400° C. A contact sulfuric acid process begins almost at once and the SO$_3$ formed tends to destroy the alkalinity both of the artificial carrier and of the zeolite film.

Instead of an artificial carrier, fragments of quartz, "celite," quartz filter stones, diatomaceous stones or flints may be used.

Naphthalene vapors mixed with a large excess of air, for example, in the ratio of 1:30 by weight are passed over the catalyst at 350–420° C. and a good yield of alphanaphthaquinone is obtained.

*Example 8.*

The following mixtures are prepared:
(1) 42 parts of SiO$_2$ in the form of a 33° Bé. potassium waterglass solution are diluted with 200 parts of water and 70 parts of "celite" are stirred in.
(2) 18.2 parts or V$_2$O$_5$ are dissolved in a concentrated caustic potash solution to form a 10% potassium vanadate solution.
(3) 5 parts of aluminum oxide are dissolved up in 5 N potassium hydroxide solution to form potassium aluminate.

Mixtures 1, 2 and 3 are poured together and heated to 60–70° C. 10% sulfuric acid is then permitted to run in with vigorous agitation until the whole mass solidifies to a gel which must remain alkaline to litmus. This is then sucked, well pressed and dried at temperatures below 100° C., whereupon the mass is broken into fragments and sprayed with sulfuric acid of a strength of 1 part concentrated sulfuric acid to 5 parts of water until a sample submerged in water in a test tube and warmed shows an acid reaction to congo. The product is an acid sulfuric acid salt-like body of the zeolite in which vanadium and aluminum are present in non-exchangeable form.

The catalyst is calcined with air at 300–400° C. and a mixture of naphthalene vapor and air in proportions of 1:10 to 1:15 is passed over the catalyst at 380–450° C. An almost theoretical yield of phthalic anhydride is obtained.

*Example 9.*

A catalyst is prepared in a manner similar to that described in Example 8, except that the proportion of $V_2O_5$ to $Al_2O_3$ is as 18.2 is :10.2. This catalyst preferentially catalyzes the oxidation of benzol and phenol to maleic acid when their vapors, mixed with air, are passed over the catalyst under reaction conditions similar to those in Example 8.

*Example 10.*

60 parts of "celite" or a mixture of 40 parts "celite" and 40 parts finely broken quartz, pumice, glass, neutral silicates or asbestos fibres are suspended in 300 parts of water. To this slurry is added a solution of potassium vanadate containing 14 parts of $V_2O_5$ dissolved in 5 N potassium hydroxide solution containing 12 parts of 100% KOH. The mixture is heated up to 60–65° C. and 2N sulfuric acid is added with vigorous agitation precipitating finely divided $V_2O_5$ in the carrier material. The amount of 2 N sulfuric acid should be so chosen as to result in a solution which is acid to congo. The suspension is then heated for one-half an hour at 95° C. with vigorous agitation so that the $V_2O_5$ which is present in colloidal solution is completely precipitated. The mixture is then sucked and the cake washed with water until the wash water is no longer acid to congo, whereupon the cake is dried and comminuted. 100 parts of potassium waterglass solution of 30° Bé. are diluted with 24–40 parts of water and kneaded into the impregnated carrier described above, the kneading being continued until the brown color of the $V_2O_5$ has disappeared. The product is then formed into fragments, and constitutes a diluted zeolite in which $V_2O_5$ is present in non-exchangeable form.

In a similar manner, a zeolite can be prepared by substituting an equivalent amount of potassium vanadite for the potassium vanadate, in which case the zeolite will contain tetravalent vanadium. A mixture of the solutions may also be used, producing a zeolite containing both tetravalent and pentavalent vanadium in non-exchangeable form.

The catalyst thus produced can be used in the vapor phase catalytic oxidation of anthracene to anthraquinone or toluol and its derivatives, such as xylols, mesitylene, pseudocumene and paracymene to the corresponding aldehydes. The hydrocarbon vapors are mixed with air or other oxygen containing gases in the proportion of from 1:3 to 1:5, the figures being based on the oxygen content of the gases, and the mixture is then passed over the catalyst at 320–420° C.

Still better results can be obtained when oxidizing anthracene to anthraquinone if the zeolite is repeatedly digested with 5% ferric sulfate or ferric chloride, thus introducing ferric iron by base exchange.

*Example 11.*

A catalyst is prepared as described in Example 10 and is then sprayed with 5–10% sulphuric or phosphoric acid to form the so-called salt-like body which is then heated with air at 400° C. An excellent yield of phthalic anhydride of high purity is obtained when naphthalene vapors and air in the proportion of from 1:10 to 1:30 are passed over the catalyst at 370–450° C.

A still better catalyst for the oxidation of naphthalene to phthalic anhydride is obtained if the zeolite is sprayed with a 3% vanadyl sulfate solution instead of sulfuric or phosphoric acid solutions. After the calcination in air at a temperature of 450° C., this catalyst will give excellent yields of phthalic anhydride under the reaction conditions described above and can be loaded to almost double the capacity of the previously described catalyst.

*Example 12.*

A zeolite catalyst is prepared as described in the last paragraph of the foregoing example and is used for the oxidation of eugenol and isoeugenol to vanillin and vanillic acid, the eugenol vapors being mixed with air in the proportion of 1:18 and passed over the catalyst at 350–450° C. Better yields can be obtained by using a circulatory process in which carbon dioxide and oxygen take the place of air. Preferably, in such a case the reaction gas should contain 90–95 volumes of $CO_2$ to 10–5 volumes of oxygen, the oxygen used being replaced in a suitable part of the circulatory system and the reaction products being removed from the cycle.

*Example 13.*

A zeolite is prepared as described in Example 10, but uranium is introduced by base exchange, the zeolite being treated with a 3–5% solution of uranyl chloride sulfate or nitrate. This catalyst is excellently suited for the vapor phase oxidation of toluol to benzaldehyde and benzoic acid and the halogen and nitro substituted toluols such as, for example, ortho and parachlortoluols, dichlortoluols, chlorbromtoluols, nitrotoluols, chlornitrotoluols and bromnitrotoluols to the corresponding substituted benzaldehydes and benzoic acids. The catalyst may also be used for the vapor phase oxidation of fluorenes to fluorenones. The vapors of the aromatic compounds are mixed with air in the proportion of from 1:15 to 1:50 by weight and are passed over the catalyst at from 320-450° C. The yields of the aldehydes and acids are from 68-85% of the theory, provided the reactions are carried out in converters with excellent heat dissipating capacities such as, for example, tubular converters provided with suitable liquid cooling media, such as, for example, mercury. In such converters, the contact mass preferably should not be thicker than 20-40 cm.

Example 14.

A zeolite containing uranium in exchangeable form, as described in the foregoing example, is treated with one or more salts of tantalic, tungstic, molybdic or chromic acids, preferably potassium or ammonium salts, by spraying the zeolite with solutions of the salts. The products are then washed and constitute excellent catalysts for the oxidation of xylols, mesitylene, pseudocumene and paracymene to the corresponding aldehydes and acids, the hydrocarbon vapors mixed with air in the proportion of about 1:25 by weight being passed over the catalyst at 370-450° C.

The same catalyst may be used also for the vapor phase oxidation of phenanthrene to phenanthraquinone under the same reaction conditions.

If ammonium vanadate is substituted for the salts of the other acids of the fifth and sixth groups of the periodic system the phenanthrene is mainly oxidized to diphenic acid.

Example 15.

60 parts of "celite" or a mixture of 40 parts of "celite" and 40 parts of finely divided quartz or other diluents as described in Example 9, are suspended in 300 parts of water. A solution of potassium vanadate or vanadite is formed by dissolving 14 parts of $V_2O_5$ or $V_2O_4$ in 5 N potassium hydroxide solution containing 12 parts of 100% KOH, and the solution stirred into the suspension. 100 parts of potassium waterglass solution of 33° Bé. is diluted with three times the amount of water and run into the mixture, whereupon a 5-10% sulfuric or phosphoric acid solution or a mixture of the two acids is cautiously added in small portions until the zeolite precipitates out in the form of a thick gel, care being taken that the gel remains alkaline to litmus. This is then sucked and the cake dried at temperatures below 100° C., whereupon it is broken into fragments which are then sprayed with sufficient 5-10% sulfuric acid so that a sample suspended in water gives an acid reaction to congo. Instead of spraying with dilute acid, the dried zeolite may be calcined at temperatures of 450-500° C. with oxidizing gases containing 7% of $SO_2$. The catalyst obtained by either method is excellent for oxidation of naphthalene to alphanaphthaquinone in the vapor phase, a mixture of naphthalene vapors and air in the proportion of from 1:30 to 1:45 by weight being passed over the catalyst at a temperature of 370-420° C.

The same catalyst can be rendered suitable for the oxidation of naphthalene to phthalic anhydride by washing the carefully prepared zeolite body three or four times with 200 parts of water, the further treatment with acids or acid gases being the same. This wash treatment removes excess alkali and the catalyst thus produced tends to oxidize naphthalene to phthalic anhydride. This is an excellent example of the effect of salts of alkali-forming metals as stabilizers, since, of course, the excess alkali is transformed into the corresponding salt by treatment with dilute acids or calcining with acid gases. The stabilizing or damping effect of the alkali metal salt is sufficient to change a phthalic anhydride catalyst to one which favors the next lower stage of oxidation, namely, alphanaphthaquinone.

Example 16.

60 parts of "celite" or a mixture of 40 parts of "celite" and 40 parts of finely divided quartz or other diluents described in Examples 9 and 15, are mixed with 100 parts of potassium waterglass solution of 33° Bé. diluted with three time the amount of water. 14 parts of vanadic acid are then reduced by means of $SO_2$ in an aqueous suspension, acidified with sulfuric acid as described in Example 2, until the blue vanadyl sulfate solution is formed. This solution is then added to the mixture with vigorous agitation, maintaining the waterglass suspension alkaline to litmus throughout. A gel forms which is sucked in the usual manner and treated as described in the last examples. The catalyst, depending on the after treatment, is excellent for the catalytic oxidation of benzol to benzoquinone, cresol to salicylaldehyde and salicylic acid, and naphthalene to alphanaphthaquinone. If the zeolite is washed several time with 200 parts of water before drying or calcining, the catalyst then causes the oxidation of the naphthalene to phthalic anhydride when naphthalene vapors and air are passed over it under the reaction conditions described in the foregoing examples.

Similar catalysts can also be obtained by forming salt-like bodies with the zeolite or by introducing other cations by base exchange.

Example 17.

14 parts of $V_2O_5$ are dissolved up in a 37% solution of potassium hydroxide containing 9 parts of KOH to form the potassium vanadate. This solution is then diluted with 300 parts of water and comminuted pumice stone, quartz, or preferably, natural zeolites, are stirred in until the suspension just remains easily stirrable. In the case of most of the diluent bodies, this will require about 100–150 parts. A solution of 26 parts of silver nitrate and 100 parts of water is then mixed with the dilute vanadate suspension and a little 10% sulfuric acid is added in order to produce a neutral reaction to litmus after all of the silver nitrate has been added. A yellow silver vanadate is precipitated on the diluent bodies. 140 parts of 33° Bé. potassium waterglass solution is then mixed with the silver vanadate suspension. A vanadyl sulfate solution is prepared from the reduction of a vanadic oxide suspension in sulfuric acid containing 16 parts of $V_2O_5$. The reducing agents may be $SO_2$, hydrogen, nitrous acid, oxalic acid, nitric acid, tartaric acid, sugar, methyl alcohol, formaldehyde or the like. The vanadyl sulfate solution is then poured into the suspension containing the waterglass and a black zeolite body is precipitated, in which the silver contained in the silver vanadate is for the most part reduced to metallic silver in a very finely divided form.

The zeolite gel formed is separated in the usual way, broken into fragments and is an excelent catalyst for the oxidation of methyl alcohol and methane to formaldehyde, ethyl alcohol to acetic acid, and ethylenechlorhydrine to chloracetic acid. The alcoholic vapors mix with air in the proportion of 1:20 and are passed over the catalysts at temperatures of 360°–420° C.

The catalyst may also be used for the oxidation of tar acids to maleic and fumaric acids under similar reaction conditions.

Example 18.

85 parts of potassium tungstate are dissolved in 250 parts of water and acidulated with 3% hydrochloric acid. The solution is then diluted with 700 parts of water and 68 parts of a commercial waterglass solution of 36° Bé. are stirred in vigorously and the mixture heated to about 65° C. The mass gelatinizes after a while and with further stirring becomes granular. The precipitate is then pressed, dried and constitutes a zeolite in which tungsten is present in nonexchangeable form. The zeolite is then treated with sulfuric acid vapors and broken into fragments.

Toluol, xylol, mesitylene, pseudocumene, or paracymene are oxidized by passing their vapors mixed with air in the proportions described in the foregoing example over the catalyst at 330–450° C. Excellent yields of the corresponding aldehydes are produced.

Example 19.

A mixture of 4 parts of $V_2O_5$, 9 parts of pulverized silica, 3 parts of $TiO_2$, 1.9 parts of 90% KOH, 10 parts of $K_2CO_3$ and 33 parts of borax are heated to red heat and maintained at this temperature until evolution of $CO_2$ ceases and the melt appears homogeneous. The melt is then poured into water and leached with flowing water until the wash water no longer contains any traces of boric acid. The zeolite produced is then pulverized and coated onto 150–200 parts of finely comminuted quartz fragments, using potassium waterglass as an adhesive. Instead of using waterglass, potassium bisulfate, phosphate, nitrate, or nitrite may be used. It is advantageous to etch the quartz fragments with hydrofluoric acid in order to produce a rough surface. When waterglass is used as an adhesive, it is desirable to neutralize the alkalinity by a spraying with 5% sulfuric or phosphoric acid.

Vapors of toluol, chlortoluol, or nitrotoluol mixed with air in the proportion of about 1:12 are passed over the catalyst at 330–450° C. and are oxidized to the corresponding aldehydes.

Example 20.

22.2 parts of $Ta_2O_5$ in the form of potassium tantalate and 11.8 parts of $WO_3$ in the form of potassium tungstate are disolved in 500 parts of water and $Ta_2O_5$ and $WO_3$ are precipitated in very fine subdivision by adding a 10% sulfuric acid solution with vigorous agitation, the amount of acid added being sufficient to effect complete precipitation. 28.6 parts of $UO_3$ in the form of a 5% aqueous solution of uranyl nitrate is added and uranium hydroxide precipitated by the addition of a normal solution of potassium hydroxide in amount sufficient to effect complete precipitation. 65–70 parts of $SiO_2$ in the form of a 33° Bé. potassium waterglass solution are diluted with 200 parts of water and introduced into the suspension of the oxides with vigorous agitation, the mixture being warmed up to about 75° C. The mass solidifies to a gel, which, on further stirring, breaks up into fragments. These fragments are sucked as usual and washed with several portions of 100 parts of water each. The washing may also be effected by drying the pressed gel at temperatures below 100° C., and then permitting water to trickle over it, which causes the mass to break up into small granules.

The product obtained is a zeolite in which tantalum, tungsten and uranium are present in non-exchangeable form. Vapors of toluol or its derivatives mixed with air in the proportion of from 1:12 to 1:20 by weight are passed over the catalyst at temperatures of 340–450°. Excellent yields of the corresponding aldehydes are obtained, the catalyst acting preferentially to produce aldehydes rather than acids.

*Example 21.*

The catalyst is prepared as described in Example 20 and is then treated with a copper sulfate solution to introduce copper by base exchange. Preferably, the solution is of about 5% strength. Vapors of toluol and its derivatives mixed with air in the proportions described in Example 20 are passed over the catalyst at the same temperature as described in the example and excellent yields of benzoic acid or the corresponding substituted acids are obtained, the catalyst preferentially oxidizing the side chain of the compounds to the acid rather than the aldehyde.

Examples 20 and 21 are excellent illustrations of the marked effect produced by introducing additional catalytic elements by base exchange.

*Example 22.*

14.4 parts of molybdic oxide in the form of potassium molybdate are dissolved in 400 parts of water, into which solution 60 parts of kieselguhr are thoroughly stirred. The molybdic oxide is then precipitated in a fine state of subdivision in the kieselguhr by adding a suitable amount of 10% sulfuric acid. 125 parts of a 33° Bé. potassium waterglass solution are added with vigorous agitation and the mixture warmed to 70–75° C. Complete precipitation is effected by adding about 100 parts of a 10% ammonium sulfate solution. The gel formed is sucked, washed with a small amount of water and then sprayed with 5% sulfuric or phosphoric acid in order to destroy the alkalinity of the zeolite, the spraying being continued until a sample when suspended in water gives an acid reaction to congo. The salt-like body produced is calcined at about 400° C.

A mixture of naphthalene vapors and air in proportion of 1:12 by weight is passed over the catalyst at 380–450° C. and excellent yields of phthalic anhydride are obtained.

*Example 23.*

A molybdic oxide kieselguhr suspension is prepared as in the foregoing examples and is then treated with a mixture of 140 parts of 33° Bé. potassium waterglass solution diluted with 300 parts of water and 10 parts of copper nitrate in the form of a 5% cuprammonium nitrate solution. 10% sulfuric acid is then added until the whole mass solidifies to a gel which is pressed, washed and then impregnated with 5% nitric acid in order to destroy the alkalinity. This treatment is followed by calcination at 400° C.

Anthracene vapors mixed with air in the proportion of 1:10 are passed over the catalyst at 380–450° C. and excellent yields of anthraquinone are obtained.

*Example 24.*

22 parts of copper carbonate and 15.4 parts of silver nitrate in 200 parts of water are treated with sufficient strong ammonia to bring them into solution. 48–50 parts of $SiO_2$ in the form of a 36° Bé. waterglass solution diluted with 400 parts of water and rendered slightly ammonical are poured into the silver and copper solutions and a 5% solution of nitric acid is added with vigorous agitation until the whole mass solidifies to a gel. The zeolite produced, which contains copper and silver in non-exchangeable form, is then separated in the usual manner and dried. Thereupon, the product is treated by causing a 5% silver nitrate solution to trickle over it in order to introduce silver by base exchange. After the base exchange is complete, the product is heated and sprayed with 2% ammonium vanadate solution in order to produce a salt-like body and then is calcined at 400° C.

Methyl alcohol vapors mixed with air in the proportion of 1:15 by weight are passed over the catalyst at temperatures of 340–400° C. and excellent yields of formaldehyde are obtained.

*Example 25.*

A gel of a vanadium zeolite as described in Example 10 is kneaded with a gel of a molybdenum zeolite as described in Example 22. The mixed zeolite obtained is then treated with gases containing 5–7% of sulfur dioxide and air at 450° C. until the alkalinity is destroyed. This catalyst is excellent for the vapor phase oxidation of naphthalene to phthalic anhydride under the reaction conditions described in some of the foregoing examples.

*Example 26.*

A mixed zeolite as described in Example 25 is washed with a dilute potassium waterglass solution prepared by diluting a 33° Bé. solution with 4 volumes of water, and is then subjected to the sulfur dioxide treatment described above. The catalyst produced is excellent for the oxidation of naphthalene to alphanaphthaquinone and produces only a small amount of phthalic anhydride. This illustrates the effectiveness of certain salts of alkali-forming metals as stabilizers for oxidation catalysts, since, of course, the $SO_2$ gases and air reacting with the additional amounts of potassium water glass produce additional amounts of potassium bisulfate.

*Example 27.*

14 parts of $V_2O_5$ are suspended in 200 parts of water and 5 parts of concentrated sulfuric acid are added. The vanadic oxide is then reduced in the usual manner at an elevated temperature with $SO_2$ to produce the vanadyl sulfate. The excess acid is then neutralized by a normal potassium hydroxide solution and 140 parts of a 33° Bé. potassium waterglass solution diluted with 300 parts of water and then added to the blue vanadyl sulfate solution, the waterglass being permitted to flow in with vigorous agitation. A gel forms at once which is pressed, washed several times with small amounts of water, totaling 300 parts, and dried at temperatures below 300° C. After drying, the zeolite is ground with 60 parts of "celite" earth and moistened with a solution of 20 parts of potassium bisulfate and 100 parts of water. The moistening is made uniform and the mass then formed to granules which are then dried and calcined at 400–450° C. in a stream of air to which, if desired, 3–6% of $SO_2$ may be added.

Naphthalene vapors mixed with air in the proportion of from 1:10 to 1:15 are passed over the catalyst at 380–440° C. Yields of phthalic anhydride amounting up to 85% of the theoretical may be obtained.

*Example 28.*

Natural or artificial zeolites in the form in which they are available commercially are digested with 5% aqueous solutions of potassium chloride, lithium chloride, rubidium chloride, cæsium chloride or mixtures in order to replace the sodium by base exchange. The zeolites are dried and 250 parts by volume are sprayed with a 2–3% ammonium vanadate or ammonium molybdate solution or a mixture of the two at an elevated temperature in order to impregnate the zeolites. The product is thereafter calcined at 400–450° C. in a stream of air and is then treated at the same temperature with a mixture of air and 5–7% of $SO_2$ containing gases, whereupon the contact sulfuric acid process begins. Air is then blown through until acid vapors are no longer noticeable.

Naphthalene vapors mixed with air in the proportion of from 1:10 to 1:20 by weight are passed over the catalyst at 370–420° C. and good yields of phthalic anhydride are obtained.

*Example 29.*

The catalyst prepared as described in Example 28 is treated before calcination with a 5% solution of equal parts of ferrous chloride and ferrous sulfate in order to produce iron vanadate or molybdate or a mixture of the two. The catalyst is then calcined and treated as described in the foregoing examples.

Anthracene or acenaphthene vapors mixed with air in the proportions of 1:10 to 1:30 by weight are passed over the catalysts at 360–420° C. Excellent yields of anthraquinone or of napthalic anhydride and hemimellitic acid are obtained, depending on the hydrocarbon vapor used.

*Example 30.*

Instead of precipitating iron vandate or molybdate in the zeolites described in Example 29, silver or copper vandates are precipitated, the impregnating solutions being used in any desired order. The catalysts are calcined and, if desired, treated with acid vapors and are excellent catalysts for the oxidation of benzol to maleic acid and of methyl alcohol to formaldehyde under the reaction conditions described in some of the foregoing examples.

*Example 31.*

Instead of using natural or artificial zeolites alone, as described in Examples 28–30, they may be diluted with kieselguhr or quartz fragments or an artificial zeolite may be prepared with the diluents incorporated into its framework, for example, by causing a solution of 140 parts of a 33° Bé. waterglass solution diluted with 300 parts of water to react with a suspension containing 70 parts of kieselguhr in a 5% potassium aluminate solution containing 10.2 parts of $Al_2O_3$. Precipitation can be completed, if necessary, by the addition of small portions of 10% sulfuric acid with vigorous agitation.

The diluted zeolite separated and washed as descirbed in the foregoing examples is then impregnated. If vanadium or molybdenum salts are used, the resulting catalysts have properties similar to those described in the three foregoing examples. If, however, tungsten, uranium or tantalum salts, singly or in mixture, are used for the impregnation, the catalysts obtained are excellent for the catalytic oxidation of toluol and its derivatives to the corresponding aldehydes and acids under reaction conditions similar to those descirbed in earlier examples.

Having thus described my invention, what I desire to secure by Letters Patent of the United States and claim is:

1. A method of oxidizing organic compounds which comprises causing the compounds to react in a vapor phase with an oxidizer in the presence of a catalyst containing a zeolite.

2. A method of oxidizing organic compounds which comprises causing the compounds to react with an oxidizer in the presence of a catalyst containing a diluted zeolite.

3. A method of oxidizing organic compounds which comprises causing the compounds to react with an oxidizer in the presence of a catalyst containing a diluted zeolite, at least part of the diluent being rich in silica.

4. A method of oxidizing organic compounds which comprises causing the compounds to react with an oxidizer in the presence of a catalyst containing a diluted zeolite, at least part of the diluent containing catalytic components.

5. A method of oxidizing organic compounds which comprises causing the compounds to react in a vapor phase with an oxidizer in the presence of a catalyst containing a zeolite, at least part of the catalyst elements present being chemically combined with the zeolite.

6. A method of oxidizing organic compounds which comprises causing the compounds to react in a vapor phase with an oxidizer in the presence of a catalyst containing a diluted zeolite, at least part of the catalytic elements present being chemically combined with the zeolite.

7. A method of oxidizing organic compounds which comprises causing the compounds to react in a vapor phase with an oxidizer in the presence of a catalyst containing a zeolite, at least part of the catalytic components being present as non-exchangeable bases in the zeolite nucleus.

8. A method of oxidizing organic compounds which comprises causing the compounds in the vapor phase to react with an oxidizing gas in the presence of a catalyst containing a zeolite, at least part of the catalytic components being present as non-exchangeable acid groups in the zeolite nucleus.

9. A method of oxidizing organic compounds which comprises causing the compounds to react with an oxidizer in the presence of a catalyst containing a zeolite, the zeolite containing both catalytically active bases and acid groups in non-exchangeable form in the zeolite nucleus.

10. A method according to claim 1, in which the catalyst contains two different types of catalytic components, at least one catalytic component being a specific catalyst for the particular reaction and at least one catalytic component being a non-specific catalyst for the particular reaction.

11. A method of oxidizing organic compounds which comprises causing the compounds to react in a vapor phase with an oxidizer in the presence of a catalyst containing a zeolite, at least part of the catalytic components being present as exchangeable bases in the zeolite.

12. A method of oxidizing organic compounds which comprises causing the compounds to react in a vapor phase with an oxidizer in the presence of a catalyst containing a zeolite, the zeolite containing catalytically active components in non-exchangeable form and also containing components in the form of exchangeable bases which increase the catalytic power of the catalyst as a whole.

13. A method according to claim 11, in which the catalyst contains two different types of catalytic components.

14. A method according to claim 12, in which at least one catalytic element is present in the zeolite both in exchangeable and non-exchangeable form.

15. A method of oxidizing organic compounds which comprises causing the compounds to react with an oxidizer in the presence of a catalyst containing a zeolite, the zeolite having been treated with a substance containing anions capable of reacting with the zeolite to form a salt-like body.

16. A method of oxidizing organic compounds which comprises causing the compounds to react with an oxidizer in the presence of a catalyst containing a zeolite, the zeolite having been treated with a substance containing catalytically active anions capable of reacting with the zeolite to form a salt-like body.

17. A method according to claim 15, in which the catalytic components are of at least two different types, at least one catalytic component being a specific catalyst for the particular reaction and at least one catalytic component being a non-specific catalyst for the particular reaction.

18. A method of oxidizing organic compounds in the vapor phase which comprises passing vapors of the compound together with oxygen-containing gases at an elevated temperature over a catalyst containing a zeolite.

19. A method of oxidizing organic compounds in the vapor phase which comprises passing vapors of the compound together with oxygen-containing gases at an elevated temperature over a catalyst containing a diluted zeolite.

20. A method of oxidizing organic compounds in the vapor phase which comprises passing vapors of the compounds together with oxygen-containing gases at an elevated temperature over a catalyst containing a diluted zeolite, at least part of the diluent being rich in silica.

21. A method of oxidizing organic compounds in the vapor phase which comprises passing vapors of the compounds together with oxygen, containing gases at an elevated temperature over a catalyst containing a diluted zeolite, at least part of the diluent containing catalytic components.

22. A method of oxidizing organic compounds in the vapor phase which comprises passing vapors of the compound together with oxygen-containing gases at an elevated temperature over a catalyst containing a zeolite, at least part of the catalyst elements present being chemically combined with the zeolite.

23. A method of oxidizing organic compounds in the vapor phase which comprises passing vapors of the compound together with oxygen-containing gases at an elevated temperature over a catalyst containing a diluted zeolite, at least part of the catalytic elements present being chemically combined with the zeolite.

24. A method of oxidizing organic compounds in the vapor phase which comprises passing vapors of the compound together with oxygen-containing gases at an elevated temperature over a catalyst containing a zeolite, at least part of the catalytic components being present as non-exchangeable bases in the zeolite nucleus.

25. A method of oxidizing organic compounds in the vapor phase which comprises passing vapors of the compound together with oxygen-containing gases at an elevated temperature over a catalyst containing a zeolite, at least part of the catalytic components being present as non-exchangeable acid groups in the zeolite nucleus.

26. A method of oxidizing organic compounds in the vapor phase which comprises passing vapors of the compound together with oxygen-containing gases at an elevated temperature over a catalyst containing a zeolite, the zeolite containing both catalytically active bases and acid groups in non-exchangeable form in the zeolite nucleus.

27. A method according to claim 18, in which the catalyst contains two different types of catalytic components, at least one catalytic component being a specific catalyst for the particular reaction and at least one catalytic component being a non-specific catalyst for the particular reaction.

28. A method of oxidizing organic compounds in the vapor phase which comprises passing vapors of the compound together with oxygen-containing gases at an elevated temperature over a catalyst containing a zeolite, at least part of the catalytic components being present as exchangeable bases in the zeolite.

29. A method of oxidizing organic compounds in the vapor phase which comprises passing vapors of the compound together with oxygen-containing gases at an elevated temperature over a catalyst containing a zeolite, the zeolite containing catalytically active components in the form of exchangeable bases which increase the catalytic power of the catalyst as a whole.

30. A method according to claim 28, in which the catalyst contains two different types of catalytic components, at least one catalytic component being a specific catalyst for the particular reaction and at least one catalytic component being a non-specific catalyst for the particular reaction.

31. A method according to claim 29, in which at least one catalytic element is present in the zeolite both in exchangeable and non-exchangeable form.

32. A method of oxidizing organic compounds in the vapor phase which comprises passing vapors of the compound together with oxygen-containing gases at an elevated temperature over a catalyst containing a zeolite, the zeolite having been treated with a substance containing anions capable of reacting with the zeolite to form a salt-like body.

33. A method of oxidizing organic compounds in the vapor phase which comprises passing vapors of the compound together with oxygen-containing gases at an elevated temperature over a catalyst containing a zeolite, the zeolite having been treated with a substance containing catalytically active anions capable of reacting with the zeolite to form a salt-like body.

34. A method according to claim 32, in which the catalytic components are of at least two different types, at least one catalytic component being a specific catalyst for the particular reaction and at least one catalytic component being a non-specific catalyst for the particular reaction.

35. A method of oxidizing organic compounds in the vapor phase which comprises causing vapors of the compounds admixed with oxygen-containing gases at an elevated temperature to pass over a catalyst containing a zeolite and a non-alkaline salt of an alkali-forming metal.

36. A method of oxidizing organic compounds in the vapor phase which comprises causing vapors of the compounds admixed with oxygen-containing gases at an elevated temperature to pass over a catalyst containing a zeolite and a non-alkaline salt of an alkali-forming metal, said salt being formed by the reaction of free alkali present in the zeolite with acid substances.

37. A method of oxidizing aromatic compounds which comprises causing the compounds to react in the presence of a catalyst containing a zeolite.

38. A method of oxidizing aromatic compounds in the vapor phase which comprises causing vapors of the compounds admixed with oxygen-containing gases at an elevated temperature to pass over a catalyst containing a zeolite.

39. A method of oxidizing aromatic compounds in the vapor phase which comprises causing vapors of the compounds admixed with oxygen-containing gases at an elevated temperature to pass over a catalyst containing a zeolite, and having associated therewith a non-alkaline salt of an alkali-forming metal.

40. A method of side chain oxidation of aromatic compounds to aldehydes and acids which comprises causing the compounds to react in a vapor phase with oxidizers in the presence of a catalyst containing a zeolite and which preferentially catalyzes the reaction.

41. A method of side chain oxidation of aromatic compounds to aldehydes and acids in the vapor phase which comprises causing vapors of the compounds admixed with oxygen-containing gases at an elevated temperature to pass over a catalyst containing a zeolite and which preferentially catalyzes the reaction.

42. A method of side chain oxidation of aromatic compounds to aldehydes and acids in the vapor phase which comprises causing vapors of the compounds admixed with oxygen-containing gases at an elevated temperature to pass over a catalyst containing a zeolite and which preferentially catalyzes the reaction, said catalyst having associated with it a non-alkaline salt of an alkaline-forming metal.

43. A method according to claim 40, in which the side chain oxidized is a methyl group.

44. A method according to claim 41, in which the side chain oxidized is a methyl group.

45. A method according to claim 42, in which the side chain oxidized is a methyl group.

46. A method of catalytically dehydrogenating aromatic hydrocarbons which comprises causing the hydrocarbon to react with an oxidizer in the presence of a catalyst containing a zeolite and which preferentially catalyzes the reaction.

47. A method of catalytically dehydrogenating aromatic hydrocarbons in the vapor phase which comprises causing vapors of the hydrocarbon admixed with oxygen-containing gases at an elevated temperature to pass over a catalyst containing a zeolite and which preferentially catalyzes the reaction.

48. A method of catalytically dehydrogenating aromatic hydrocarbons in the vapor phase which comprises causing vapors of the hydrocarbon admixed with oxygen-containing gases at an elevated temperature to pass over a catalyst containing a zeolite and preferentially catalyzing the reaction, said catalyst having associated with it a relatively large amount of a non-alkaline salt of an alkali-forming metal.

49. A method of catalytically oxidizing toluol to benzaldehyde and benzoic acid which comprises causing the toluol to react with an oxidizer in the presence of a catalyst containing a zeolite and which preferentially catalyzes the reaction.

50. A method of catalytically oxidizing toluol to benzaldehyde and benzoic acid in the vapor phase which comprises causing vapors of toluol admixed with oxygen-containing gases at an elevated temperature to pass over a catalyst containing a zeolite and which preferentially catalyzes the reaction.

51. A method of catalytically oxidizing toluol to benzaldehyde and benzoic acid in the vapor phase which comprises causing vapors of toluol admixed with oxygen-containing gases at an elevated temperature to pass over a catalyst containing a zeolite and which preferentially catalyzes the reaction, said catalyst having associated with it a non-alkaline salt of an alkali-forming metal.

52. A method of oxidizing aromatic compounds which comprises causing the compounds to react in a vapor phase in the presence of a catalyst containing a zeolite, said catalyst containing vanadium.

53. A method of oxidizing aromatic compounds in the vapor phase which comprises causing vapors of the compounds admixed with oxygen-containing gases at an elevated temperature to pass over a catalyst containing a zeolite, said catalyst containing vanadium.

54. A method of oxidizing aromatic compounds in the vapor phase which comprises causing vapors of the compounds admixed with oxygen-containing gases at an elevated temperature to pass over a catalyst containing a zeolite, said catalyst containing vanadium and having associated therewith a non-alkaline salt of an alkali-forming metal.

55. A method of oxidizing aromatic compounds which comprises causing the compounds to react in a vapor phase in the presence of a catalyst containing a zeolite, said catalyst containing vanadium chemically combined in the zeolite.

56. A method of oxidizing aromatic compounds in the vapor phase which comprises causing vapors of the compounds admixed with oxygen-containing gases at an elevated temperature to pass over a catalyst containing a zeolite, said catalyst containing vanadium chemically combined in the zeolite.

57. A method of oxidizing aromatic compounds in the vapor phase which comprises causing vapors of the compounds admixed with oxygen-containing gases at an elevated temperature to pass over a catalyst containing a zeolite, said catalyst containing vanadium chemically combined in the zeolite and having associated therewith a non-alkaline salt of an alkali-forming metal.

58. A method of oxidizing aromatic compounds which comprises causing the compounds to react in a vapor phase in the presence of a catalyst containing a zeolite, said catalyst containing vanadium chemically combined in non-exchangeable form in zeolite nucleus.

59. A method of oxidizing aromatic compounds in the vapor phase which comprises causing vapors of the compounds admixed with oxygen-containing gases at an elevated temperature to pass over a catalyst containing a zeolite, said catalyst containing vanadium chemically combined in non-exchangeable form in the zeolite nucleus.

60. A method of oxidizing aromatic compounds in the vapor phase which comprises causing vapors of the compounds admixed with oxygen-containing gases at an elevated temperature to pass over a catalyst containing a zeolite, said catalyst containing vanadium chemically combined in non-exchangeable form in the zeolite nucleus and having associated therewith a non-alkaline salt of an alkali-forming metal.

61. A method according to claim 55, in which the vanadium is present in a plurality of valences.

62. A method according to claim 56, in which the vanadium is present in a plurality of valences.

63. A method according to claim 57, in which the vanadium is present in a plurality of valences.

64. A method of catalytically oxidizing organic compounds in the vapor phase which comprises circulating vapors of the compound to be oxidized and admixed with oxygen and inert gases at an elevated temperature over a catalyst containing a zeolite, removing reaction products from the gas stream, recirculating the remaining gases and adding thereto fresh amounts of the organic compound vapor and oxygen.

Signed at Pittsburgh, Pennsylvania, this 22nd day of November, 1926.

ALPHONS O. JAEGER.